US011369227B2

(12) United States Patent
Zhu

(10) Patent No.: US 11,369,227 B2
(45) Date of Patent: Jun. 28, 2022

(54) BEVERAGE DISPENSER AND BEVERAGE BREWING METHOD

(71) Applicant: Guangdong Midea Consumer Electrics Manufacturing Co., Ltd., Foshan (CN)

(72) Inventor: Guojun Zhu, Foshan (CN)

(73) Assignee: GUANGDONG MIDEA CONSUMER ELECTRICS MANUFACTURING CO., LTD., Foshan (CN)

( * ) Notice: Subject to any disclaimer, the term of this patent is extended or adjusted under 35 U.S.C. 154(b) by 546 days.

(21) Appl. No.: 16/259,976

(22) Filed: Jan. 28, 2019

(65) Prior Publication Data

US 2020/0054161 A1 Feb. 20, 2020

(30) Foreign Application Priority Data

Aug. 20, 2018 (CN) .......................... 201810950069.9
Aug. 20, 2018 (CN) .......................... 201821347901.8
(Continued)

(51) Int. Cl.
*A47J 31/12* (2006.01)
*A47J 31/36* (2006.01)
(Continued)

(52) U.S. Cl.
CPC ......... *A47J 31/3676* (2013.01); *A47J 31/053* (2013.01); *A47J 31/12* (2013.01); *A47J 31/54* (2013.01); *A47J 31/0576* (2013.01)

(58) Field of Classification Search
CPC ....... A47J 31/053; A47J 31/0576; A47J 31/12
(Continued)

(56) References Cited

U.S. PATENT DOCUMENTS 3,270,659 A * 9/1966 Tavera .................. A47J 31/053
99/295
3,469,522 A * 9/1969 Prosen .................. A47J 31/053
99/308
(Continued)

FOREIGN PATENT DOCUMENTS

CN 102113825 A 7/2011
CN 105078236 A 11/2015
(Continued)

*Primary Examiner* — Reginald Alexander
(74) *Attorney, Agent, or Firm* — Morgan, Lewis & Bockius LLP

(57) ABSTRACT

The present disclosure provides a beverage dispenser and a beverage brewing method. The beverage dispenser is formed with a liquid chamber, a brewing chamber, a heating chamber that can heat up liquid, and a pressure chamber that can pressurize the liquid. The liquid chamber, the heating chamber, the pressure chamber, and the brewing chamber form a circulating liquid circuit, in which the liquid formed in the liquid chamber enters into the heating chamber. The liquid is heated in the heating chamber and then enters into the pressure chamber. The liquid is pressurized in the pressure chamber and then enters into the brewing chamber, and then flows out of the brewing chamber and enters into the liquid chamber. The beverage dispenser and the beverage (Continued)

brewing method provided in the present disclosure overcomes the drawbacks of manually adding hot water and manually pressurizing for producing beverage.

18 Claims, 8 Drawing Sheets

(30) Foreign Application Priority Data

| Aug. 20, 2018 | (CN) | ................ 201821347904.1 |
| Aug. 20, 2018 | (CN) | ................ 201821347932.3 |
| Aug. 20, 2018 | (CN) | ................ 201821347933.8 |
| Aug. 20, 2018 | (CN) | ................ 201821347958.8 |

(51) Int. Cl.
  *A47J 31/54* (2006.01)
  *A47J 31/053* (2006.01)
  *A47J 31/057* (2006.01)

(58) Field of Classification Search
  USPC .................................................. 99/308, 303
  See application file for complete search history.

(56) References Cited

U.S. PATENT DOCUMENTS

| 7,458,316 B2 * | 12/2008 | Scelza ............... A47J 31/005 |
| | | 126/609 |
| 9,402,405 B2 | 8/2016 | Vastardis et al. |
| 2017/0119205 A1 | 5/2017 | Powell et al. |
| 2019/0191913 A1 * | 6/2019 | Richardson ......... A47J 31/0576 |

FOREIGN PATENT DOCUMENTS

| CN | 205548330 U | 9/2016 |
| CN | 106388596 A | 2/2017 |
| CN | 106618219 A | 5/2017 |
| CN | 106859346 A | 6/2017 |
| CN | 206239105 U | 6/2017 |
| CN | 107028503 A | 8/2017 |
| CN | 206403624 U | 8/2017 |
| CN | 206518463 U | 9/2017 |
| CN | 107307744 A | 11/2017 |
| CN | 108261081 A | 7/2018 |
| CN | 209346685 U | 9/2019 |
| WO | WO 2008022811 A1 | 2/2008 |
| WO | WO 2016096730 A1 | 6/2016 |

* cited by examiner

BEVERAGE DISPENSER AND BEVERAGE BREWING METHOD

CROSS-REFERENCE TO RELATED APPLICATIONS

This application claims priority to: (i) Chinese Patent Application No. 201810950069.9, entitled "BEVERAGE DISPENSER AND BEVERAGE BREWING METHOD" filed with the State Intellectual Property Office of P. R. China on Aug. 20, 2018, (ii) Chinese Patent Application No. 201821347933.8, entitled "BEVERAGE DISPENSER AND BEVERAGE BREWING METHOD" filed with the State Intellectual Property Office of P. R. China on Aug. 20, 2018, (iii) Chinese Patent Application No. 201821347932.3, entitled "BEVERAGE DISPENSER AND BEVERAGE BREWING METHOD" filed with the State Intellectual Property Office of P. R. China on Aug. 20, 2018, (iv) Chinese Patent Application No. 201821347904.1, entitled "BEVERAGE DISPENSER AND BEVERAGE BREWING METHOD" filed with the State Intellectual Property Office of P. R. China on August 20, 2018, (v) Chinese Patent Application No. 201821347901.8, entitled "BEVERAGE DISPENSER AND BEVERAGE BREWING METHOD" filed with the State Intellectual Property Office of P. R. China on Aug. 20, 2018, and (vi) Chinese Patent Application No. 201821347958.8, entitled "BEVERAGE DISPENSER AND BEVERAGE BREWING METHOD" filed with the State Intellectual Property Office of P. R. China on Aug. 20, 2018, all of which are incorporated herein by reference.

TECHNICAL FIELD

The present disclosure relates to the technical field of beverage brewing, particularly to a beverage dispenser and a beverage brewing method.

BACKGROUND

Usually, beverage machines available in the market are large in size and mainly oriented to scenarios of application at home or in offices. Those beverage machines can't meet the requirement for application in outdoor scenarios.

To meet the demand of outdoor enthusiasts, compact and portable beverage dispensers have been introduced into the market. However, at present, most of such products don't have heating function and beverage brewing capability. Especially, for beverage that must be brewed under pressure, the user has to add hot water and operate manually (e.g., apply pressure by means of a pump) to produce high pressure water so as to brew the beverage. Therefore, existing portable beverage dispensers have their limitations and can't meet the demand of users for producing beverage when required conditions are inadequate.

SUMMARY

The object of the present disclosure is to overcome the drawbacks of the portable beverage dispensers in the prior art, i.e., the portable beverage dispensers don't have a heating function, and the user has to add hot water and pressurize manually to brew beverage.

To attain the object described above, in one aspect, the present disclosure provides a beverage dispenser, which is formed with a liquid chamber, a brewing chamber, a heating chamber that can heat up liquid, and a pressure chamber that can pressurize the liquid, wherein, the volume of the liquid chamber is greater than or equal to the volume of the brewing chamber;

Wherein, the liquid chamber, the heating chamber, the pressure chamber, and the brewing chamber form a circulating liquid circuit, in which the liquid in the liquid chamber enters into the heating chamber, is heated in the heating chamber and then enters into the pressure chamber, is pressurized in the pressure chamber and then enters into the brewing chamber, and then flows out of the brewing chamber and enters into the liquid chamber.

In some embodiments, the volume V1 of the heating chamber is: 5 ml<V1<20 ml, and the heating power P for heating in the heating chamber is: 50 W<P<300 W.

In some embodiments, a first path is provided between the liquid chamber and the heating chamber, a first check valve is provided in the first path, and the liquid in the liquid chamber can enter into the heating chamber by opening the first check valve.

In some embodiments, the first check valve is configured to cut off the first path under the driving power of water vapor formed from the liquid heated in the heating chamber.

In some embodiments, a second path is provided between the pressure chamber and the heating chamber, and the liquid in the heating chamber enters into the pressure chamber along the second path under the action of the pressure of the water vapor formed through the heating.

In some embodiments, a third path is provided between the pressure chamber and the brewing chamber, a second check valve is provided in the third path and is configured to open the third path under the action of the pressure in the pressure chamber.

In some embodiments, the beverage dispenser comprises:

A cup body, which forms the liquid chamber and has a water outlet for communicating with the heating chamber;

A cup cover that covers a top opening of the cup body, wherein, a pressurizing device that has the pressure chamber is provided at an inner side of the cup cover that faces the cup body;

A brewing cup, which forms the brewing chamber and is disposed between the pressure chamber and the cup body, and has a water inlet that can communicate with the pressure chamber and a water outlet that communicates with the liquid chamber;

A boiler and a heating component for heating the boiler, wherein, the boiler forms the heating chamber, is disposed below the cup body, and has an inlet that communicates with the liquid chamber and an outlet that communicates with the pressure chamber.

In some embodiments, a supporting plate fixed to the cup body is provided below the cup body and configured to support the boiler.

In some embodiments, the beverage dispenser further comprises a housing, which comprises an outer cover and a main housing body that has a top opening, wherein, the outer cover covers the cup cover, and the main housing body accommodates the cup body, the boiler, and the heating component;

Wherein, a plurality of columns for mounting bolts are provided at the bottom of the cup body, a plurality of bolt mounting parts that correspond to the columns respectively and thereby are fixed to the columns by bolts are provided on a bottom enclosure of the main housing body, and the supporting plate configured to support the boiler is fixed between the bolt mounting parts and the columns.

In some embodiments, puncturing pieces configured to puncture beverage capsules placed in the brewing chamber are provided on the top part and bottom part of the brewing chamber inside the brewing chamber.

In some embodiments, the cup body comprises a main cup body in which the liquid chamber is formed, a boss is formed on the bottom of the main cup body, and the water outlet is provided on the boss.

In some embodiments, the cup body comprises a main cup body in which the liquid chamber is formed, a second pipe connector configured to connect a pipeline and a third pipe connector that communicates with the second pipe connector and is configured to connect another pipeline are provided on the top part of the main cup body, the second pipe connector communicates with the pressure chamber through a pipeline, and the third pipe connector communicates with the heating chamber through a pipeline.

In some embodiments, the cup cover has a top wall and a side wall that has female threads to be screwed to the cup body by rotation, and the pressurizing device is arranged in a way that it can rotate around an axis of rotation of the cup cover with respect to the cup cover.

In some embodiments, the pressurizing device comprises a shell in which the pressure chamber is formed, and an inflow channel through which fluid can flow to the pressure chamber and an outflow channel through which the fluid in the pressure chamber can flow out are provided on the shell, wherein, the outflow channel is provided with the second check valve that can be opened when the pressure in the pressure chamber reaches a preset value.

In some embodiments, the outflow channel comprises a first pipeline section that is provided on the shell and has an inlet of the outflow channel, a second pipeline section that is provided on the shell and has an outlet of the outflow channel, and a communicating pipeline section that is provided between the first pipeline section and the second pipeline section and communicate with the first pipeline section and the second pipeline section, and the first pipeline section, the communicating pipeline section, and the second pipeline section are connected to form a curved pipeline, wherein, the second check valve is arranged in the first pipeline section.

In some embodiments, the inflow channel comprises a water feed connector that protrudes from the shell and a water outflow pipeline section that communicates with the water feed connector and extends into the pressure chamber.

In some embodiments, a pressure relief valve is provided on the shell.

In some embodiments, the brewing cup is mounted on the top opening of the cup body; wherein, the brewing cup comprises a main body part that has the brewing chamber, and a plurality of legs provided in a spaced manner in the circumferential direction on the main body part; a plurality of mounting parts corresponding to the legs respectively are provided in a spaced manner in the circumferential direction of the top opening on the cup body, and the plurality of legs are mounted removably to the mounting parts respectively.

In another aspect, the present disclosure further provides a beverage brewing method, which comprises:

Injecting liquid into a liquid chamber;

The liquid in the liquid chamber enters into a heating chamber for heating;

The liquid heated in the heating chamber enters into a pressure chamber for pressurization;

The liquid pressurized in the pressure chamber enters into the brewing chamber to brew a raw beverage material in the brewing chamber; and The beverage brewed in the brewing chamber returns to the liquid chamber.

In some embodiments, a first check valve is provided in a first path between the liquid chamber and the heating chamber, a valve spool of the first check valve can move by its gravity and the action of the liquid pressure in the liquid chamber and thereby keeps the first check valve in an open state, so that the liquid in the liquid chamber enters into the heating chamber via the first check valve.

In some embodiments, water vapor produced from the liquid in the heating chamber in the heating process enters into the first path and drives the valve spool of the first check valve to move, and thereby closes the first check valve.

In some embodiments, a second path is provided between the heating chamber and the pressure chamber, and the liquid heated in the heating chamber enters into the pressure chamber along the second path under the action of the pressure of the water vapor produced through the heating.

In some embodiments, a third path is provided between the pressure chamber and the brewing chamber, a second check valve is provided in the third path, and the second check valve is opened when the pressure in the pressure chamber reaches a preset value. In some embodiments, the liquid is circulated through the liquid chamber, the heating chamber, the pressure chamber, and the brewing chamber over and again.

In some embodiments, in each circulation cycle of the liquid, the liquid is injected from the liquid chamber to the heating chamber for several times.

With the beverage dispenser and the beverage brewing method provided in the present disclosure, the user doesn't have to add hot water manually; in addition, cold water may be used to produce hot beverage through heating. The beverage dispenser and the beverage brewing method are especially applicable to portable beverage dispensers, and overcome the drawback that hot water has to be added manually in portable beverage dispensers available in the market. Besides, the beverage dispenser provided in the present disclosure is designed to produce beverage automatically without manual operation for pressurization.

BRIEF DESCRIPTION OF SYMBOLS

10—liquid chamber; 20—heating chamber; 30—pressure chamber; 40—brewing chamber; 1—cup body; 11—water outlet; 111—first pipe connector; 12—boss; 13—first pipeline; 14—second pipeline; 15—second pipe connector; 16—third pipe connector; 17—male thread; 18—seal groove; 181—seal ring; 19—column; 191—bolt mounting hole; 112—positioning column; 2—boiler; 21—inlet; 22—outlet; 23—supporting plate; 3—pressurizing device; 31—main shell body; 311—fixing column; 32—top cover; 33—water feed connector; 331—seal ring; 34—water outflow pipeline section; 35—first pipeline section; 36—second check valve; 37—communicating pipeline section; 38—second pipeline section; 381—top puncturing piece; 382—filter screen; 383—stepped part; 39—pressure relief valve; 4—brewing cup; 41—main body part; 42—leg; 421—positioning hole; 43—through—hole; 44—fixing plate; 45—bolt hole; 46—bolt mounting part; 47—bottom puncturing piece; 5—first check valve; 6—cup cover; 61—top wall; 62—side wall; 63—female thread; 100—housing; 101—outer cover; 102—main housing body; 103—bottom enclosure; 104—bolt mounting part.

DETAILED DESCRIPTION OF THE EMBODIMENTS

Hereunder some embodiments of the present disclosure will be detailed with reference to the accompanying drawings. It should be understood that the embodiments described here are only provided to describe and explain the present disclosure rather than constitute any limitation to the present disclosure.

It is noted that the embodiments and the features in the embodiments can be combined freely, provided that there is no confliction among them.

In the description of the present disclosure, it should be understood that the orientation or position relations indicated by terms "center", "longitudinal", "transverse", "length", "width", "thickness", "above", "below", "left", "right", "vertical", "horizontal", "top", "bottom", "axial", "radial", or "circumferential", etc., are based on the orientation or position relations indicated in the accompanying drawings. They are used only to ease and simplify the description of the present disclosure, rather than indicate or imply that the involved device or component must have a specific orientation or must be constructed and operated in a specific orientation. Therefore, the use of these terms shall not be deemed as constituting any limitation to the present disclosure. In addition, "inside" and "outside" usually refer to inside and outside with respect to the outlines of the components.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature.

Figure 1:
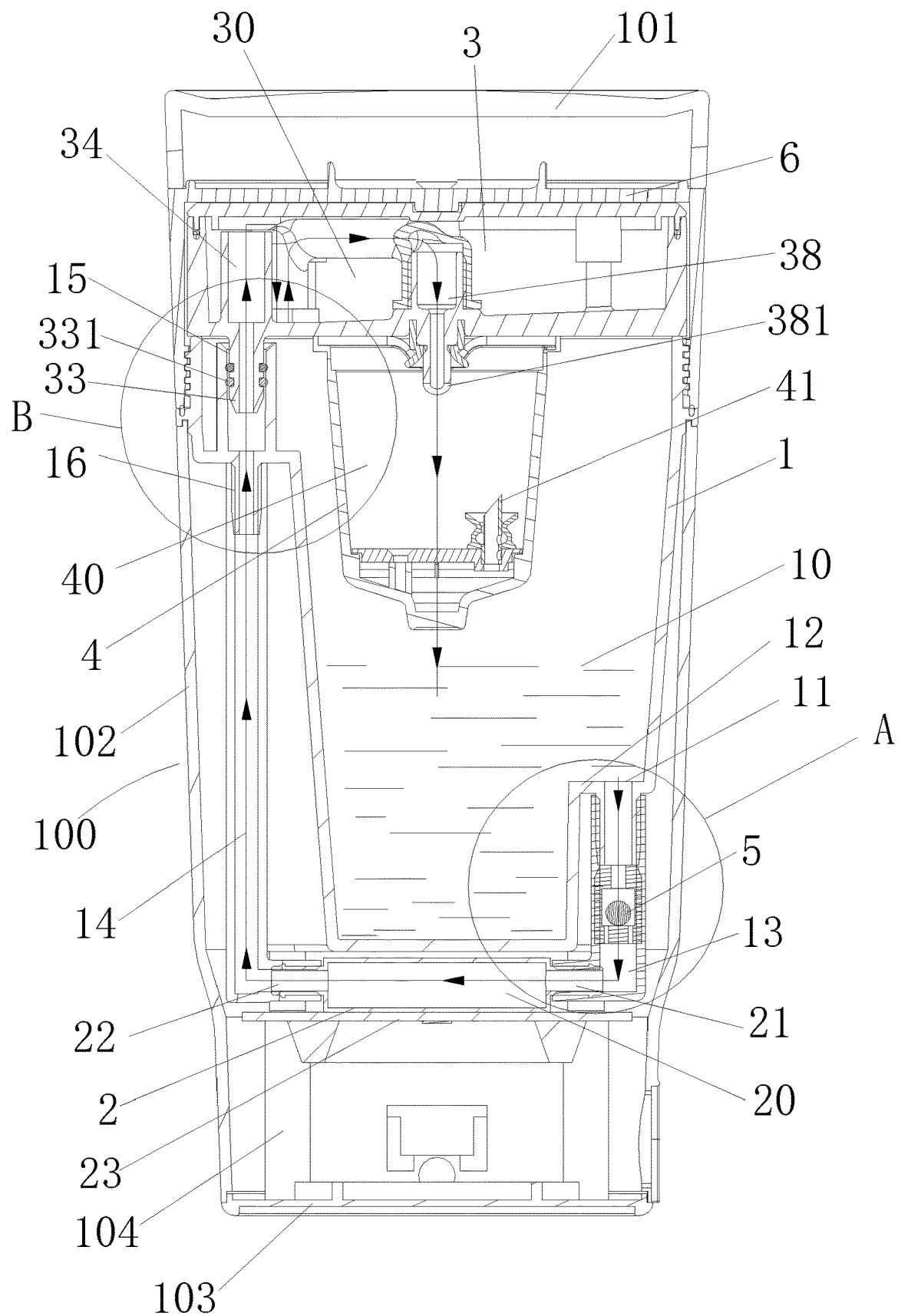
FIG. 1 is a schematic structural diagram of the beverage dispenser according to an embodiment of the present disclosure.

The present disclosure discloses a beverage dispenser, which, as shown in FIG. 1, is formed with a liquid chamber 10, a brewing chamber 40, a heating chamber 20 that can heat up liquid, and a pressure chamber 30 that can pressurize the liquid, wherein, the volume of the liquid chamber 10 is greater than or equal to the volume of the brewing chamber 40; wherein, the liquid chamber 10, the heating chamber 20, the pressure chamber 30, and the brewing chamber 40 form a circulating liquid circuit, in which the liquid in the liquid chamber 10 can enters into the heating chamber 20, is heated in the heating chamber 20 and then enters into the pressure chamber 30, is pressurized in the pressure chamber 30 and then enters into the brewing chamber 40, and then flows out of the brewing chamber 40 and enters into the liquid chamber 10.

When the beverage dispenser provided in the present disclosure is used, usually a raw beverage material, such as beverage capsules or the like, is placed in the brewing chamber. The liquid in the liquid chamber 10 enters into the heating chamber 20, and the liquid heated in the heating chamber 20 can enter into the pressure chamber 30 under the pressure of water vapor produced through the heating; as the water vapor becomes more and more and the pressure becomes higher and higher in the pressure chamber 30, the liquid in the pressure chamber 30 can enter into the brewing chamber 40 under the pressure effect, and thereby is mixed with the raw beverage material in the brewing chamber 40 to produce beverage. The beverage may enter into the liquid chamber 10 again and then enter into the heating chamber 20 from the liquid chamber 10. Thus, the beverage can be circulated in that way, cold liquid, hot liquid, and beverage can coexist, and pressurized hot beverage is produced.

With the beverage dispenser provided in the present disclosure, the user doesn't have to add hot water manually; in addition, cold water may be used to produce hot beverage through heating. The beverage dispenser is especially applicable to portable beverage dispensers, and overcomes the drawback that hot water has to be added manually in portable beverage dispensers available in the market. Besides, the beverage dispenser provided in the present disclosure is designed to produce beverage automatically without manual operation for pressurization.

Hereunder the beverage dispenser provided in the present disclosure will be detailed in embodiments.

In a preferred embodiment of the present disclosure, a first path is provided between the liquid chamber 10 and the heating chamber 20, a first check valve 5 is provided in the first path, and the liquid in the liquid chamber 10 can enter into the heating chamber 20 by opening the first check valve 5. The first check valve 5 is configured to cut off the first path under the driving power of water vapor formed from the liquid heated in the heating chamber 20.

A second path is provided between the pressure chamber 30 and the heating chamber 20; preferably, the liquid in the heating chamber 20 enters into the pressure chamber 30 along the second path under the action of the pressure of the water vapor formed through the heating.

Figure 2:
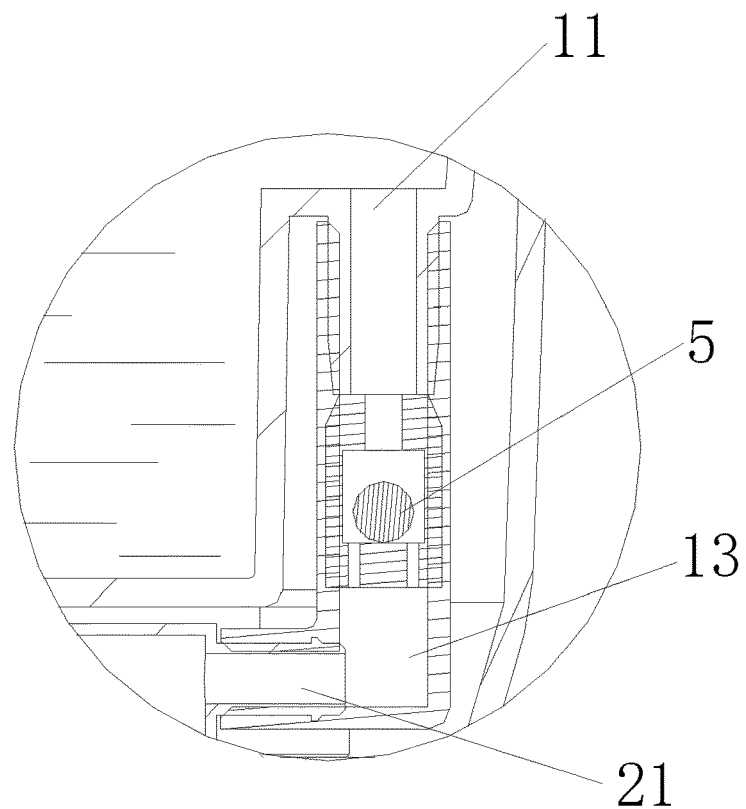
FIG. 2 is an enlarged view of part A in FIG. 1.
Figure 3:
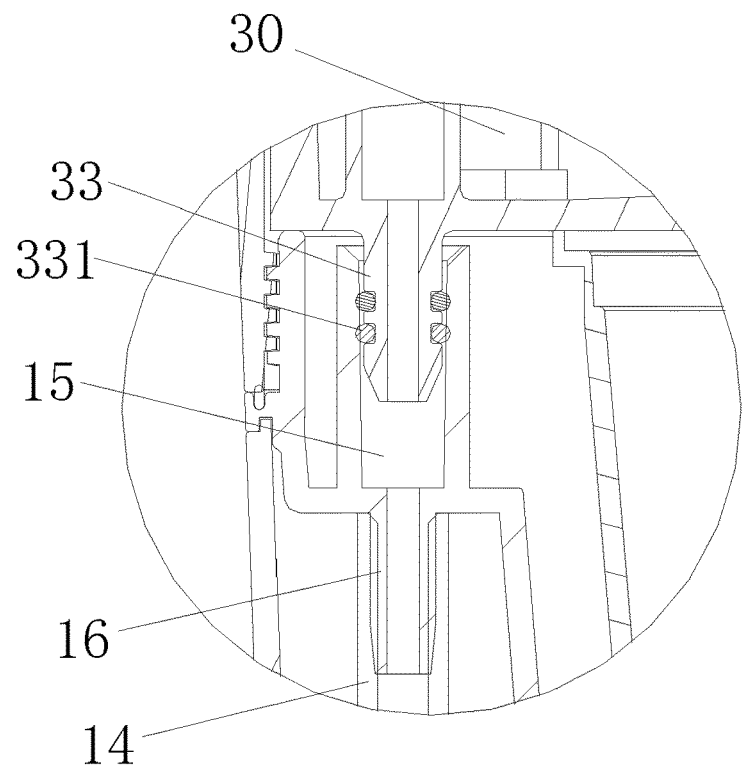
FIG. 3 is an enlarged view of part B in FIG. 1.

Specifically, as shown in FIGS. 1-3, the first path between the liquid chamber 10 and the heating chamber 20 comprises a first pipeline 13 between a water outlet of the liquid chamber 10 near the bottom of the liquid chamber 10 and an inlet 21 on the right side of the heating chamber 20; the first check valve 5 is provided in the first pipeline 13; the second path between the pressure chamber 30 and the heating chamber 20 comprises a second pipeline 14 connected to an outlet 22 on the left side of the heating chamber 20 and a water feed connector 33 that communicates with the second pipeline 14 and the pressure chamber 30.

The valve spool of the first check valve 5 in the first path moves downward by its gravity and the action of the liquid pressure in the liquid chamber 10, and thereby the first path between the liquid chamber 10 and the heating chamber 20 can be opened, and the liquid enters into the heating chamber 20 and is heated up, so that a mixture of water and vapor is formed. The mixture of water and vapor in the heating chamber 20 flows to the first path at the right side and the second path at the left side, the mixture of water and vapor in the first path drives the valve spool of the first check valve 5 to move upward, and thereby the first check valve 5 closes the first channel. The mixture of water and vapor in the second path can flow along the second path into the pressure chamber 30 under the action of vapor pressure in the heating chamber 20.

In some embodiments, the volume V2 of the second path is: 2 ml<V1<4 ml, and the length L of the second path is: 80 mm<L<150 mm. The arrangement of the second path can facilitate the water vapor in the heating chamber 20 to flow along the second path into the pressure chamber 30.

Of course, the beverage dispenser provided in the present disclosure doesn't exclude an additional water pump, which can pump the liquid in the heating chamber 20 to the pressure chamber 30.

Figure 5:
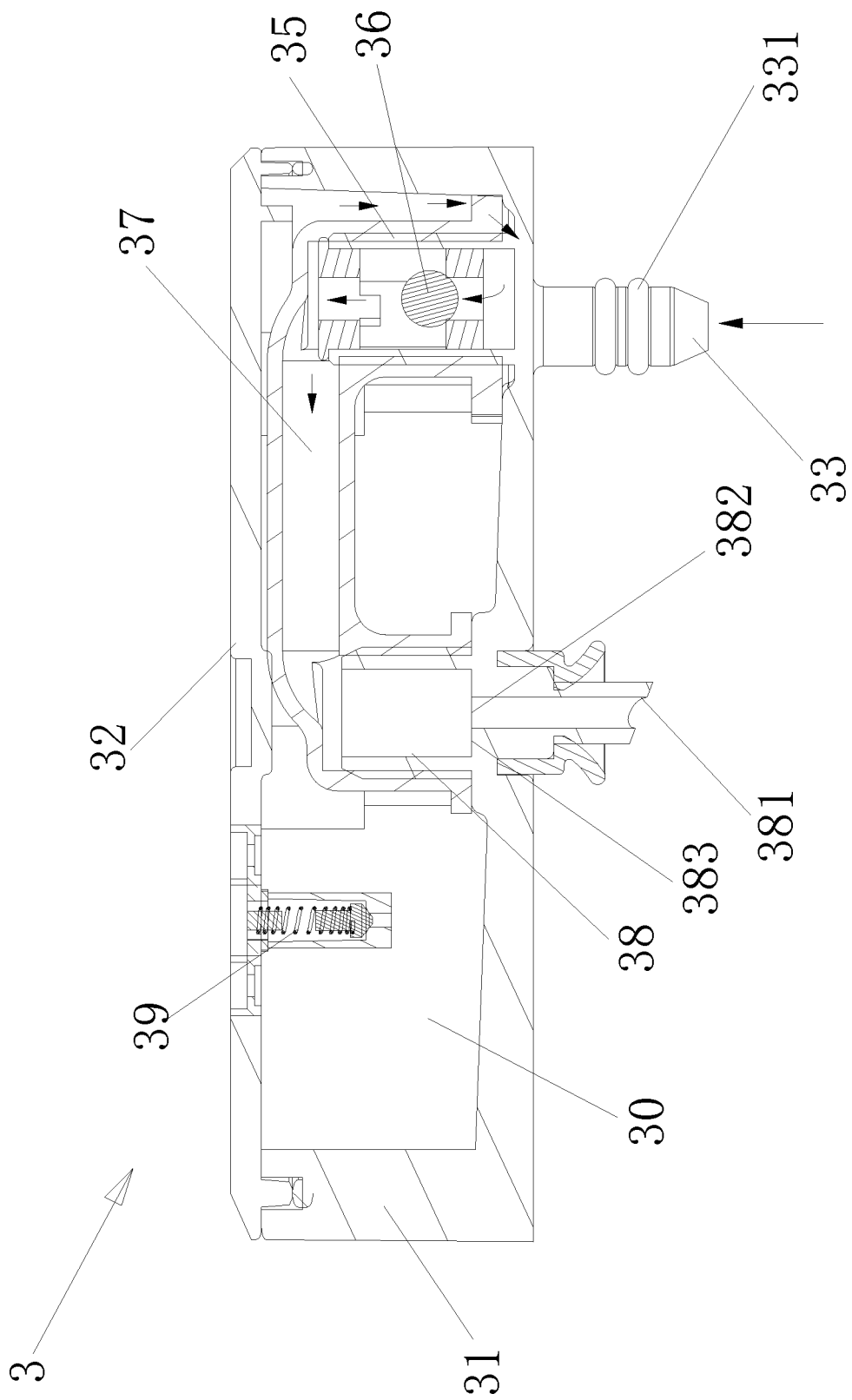
FIG. 5 is a sectional view of the structure of the pressurizing device.

A third path is provided between the pressure chamber 30 and the brewing chamber 40, and a second check valve 36 is provided in the third path, as shown in FIG. 5. The second check valve 36 is configured to open the third path under the action of the pressure in the pressure chamber 30 (the specific arrangement of the third path will be detailed later), so that the liquid in the pressure chamber 30 can flow along the third path into the brewing chamber 40 and thereby brew beverage.

In addition, in this embodiment, preferably, the volume V1 of the heating chamber 20 is: 5 ml<V1<20 ml, and the heating power P for heating in the heating chamber 20 is: 50 W<P<300 W.

In the beverage dispenser provided in the present disclosure, the liquid in the liquid chamber 10 can flow along the first path into the heating chamber 20 by opening the first check valve 5; the liquid is heated up in the heating chamber 20 and the water vapor formed from the liquid heated in the heating chamber 20 flows through the second path into the pressure chamber 30; the first check valve 5 in the first path is opened and closed repeatedly, so that the liquid in the liquid chamber 10 enters into the heating chamber 20 over and again; the liquid in the heating chamber 20 is heated up continuously, and water vapor is produced continuously. In the present disclosure, by setting the volume and heating power of the heating chamber 20 appropriately, the liquid in the heating chamber 20 can be vaporized quickly, and thereby the water vapor produced in the heating chamber 20 enters into the pressure chamber 30 continuously to pressurize in the pressure chamber 30, so that hot beverage can be brewed under pressure. Moreover, the arrangement of the heating chamber 20 in the present disclosure is helpful for meeting the requirement for a compact and portable beverage dispenser, and thereby meets the requirement for a portable beverage dispenser that has a heating function and is convenient to carry.

Hereunder the structure of the beverage dispenser will be further detailed.

As shown in FIG. 1, the beverage dispenser comprises a cup body 1, a cup cover 6, a brewing cup 4, a boiler 2, and a heating component for heating the boiler, wherein:

The cup body 1 forms the liquid chamber 10, and has a water outlet 11 for communicating with the heating chamber 20.

The cup cover 6 covers a top opening of the cup body 1, a sealing element may be provided between the cup cover 6 and the cup body 1 so that the cup cover 6 and the cup body 1 jointly form the sealed liquid chamber 10, and a pressurizing device 3 that has the pressure chamber 30 is provided at the inner side of the cup cover 6 that faces the cup body 1.

The brewing cup 4 forms the brewing chamber 40 and is disposed between the pressure chamber 30 and the cup body 1, and has a water inlet that can communicate with the pressure chamber 30 and a water outlet that communicates with the liquid chamber 10;

The boiler 2 has the heating chamber 20 formed in it, is disposed below the cup body 1, and has an inlet 21 that communicates with the liquid chamber 10 and an outlet 22 that communicates with the pressure chamber 30.

Figure 7:
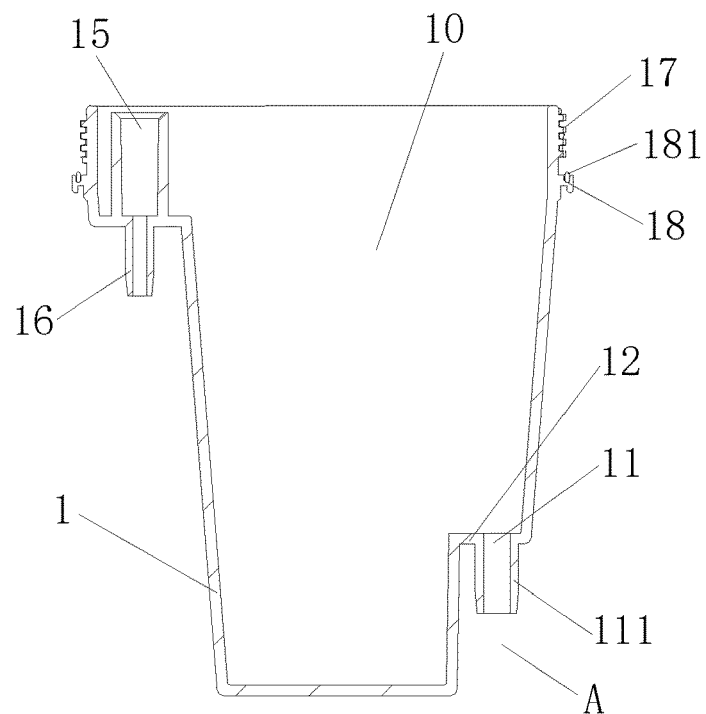
FIG. 7 is sectional view of the structure of the cup body.

Specifically, as shown in FIG. 7, the structure of the cup body 1 comprises a main cup body in which the liquid chamber 10 is formed; a boss 12 is formed on the bottom of the main cup body, and a water outlet 11 is provided on the boss 12. Since the water outlet 11 is arranged on a boss 12 above the bottom surface of the main cup body, impurities or residues in the liquid will deposit on the bottom surface of the cup body rather than flow out through the water outlet 11. Therefore, when the cup body is used in the beverage dispenser and the water outlet 11 is connected to the inlet of the boiler, the beverage in the cup body will flow through the water outlet 11 at the bottom part to the boiler, while impurities or residues will not flow into the boiler of the beverage dispenser.

To further prevent the impurities or residues in the cup body from flowing out through the water outlet 11, a filter screen may be provided on the water outlet 11.

A recessed part that is recessed to the interior of the main cup body is formed on the outer side of the bottom of the main cup body of the cup body (as illustrated by part A in FIG. 7), and the recessed part forms the boss 12 at the inner side of the main cup body. In some embodiments, a part of the bottom of the main cup body that surrounds the water outlet 11 on the recessed part on the outer side of the bottom of the main cup body bulges to form a first pipe connector 111, which is configured to connect with a pipeline to the boiler 2.

In the cup body provided in the present disclosure, a pipe connector is provided on the top part of the main cup body to enable two pipelines to communicate with each other. In some embodiments, as shown in FIGS. 1 and 3, the pipe connector comprises a second pipe connector 15 for connecting one pipeline and a third pipe connector 16 that communicates with the second pipe connector 15 and configured to connect another pipeline. The second pipe connector 15 communicates with the pressure chamber 30 through a pipeline, and the third pipe connector 16 communicates with the heating chamber 20 through a pipeline.

Specifically, the second pipe connector 15 is configured to connect to a water feed connector 33 of the pressure chamber 30 (the second pipe connector 15 is near the pressure chamber 30 at the top part of the cup body 1 so that the water feed connector 33 of the pressure chamber 30 can be connected to the second pipe connector 15 conveniently), and the third pipe connector 16 is configured to connect to a water outflow pipeline of the boiler 2 so that the liquid in the boiler 2 can flow into the pressure chamber 30 of the beverage dispenser. By providing the second pipe connector 15 and the third pipe connector 16 on the cup body to enable two pipelines to communicate with each other, the pipelines in the beverage dispenser can be connected conveniently, and the beverage dispenser has a compact structure as well.

In this embodiment, the second pipe connector 15 is configured as an upwardly directed recessed hole so that it can accommodate the water feed connector 33 of the pressure chamber 30; the third pipe connector 16 is configured to bulge downward so that it can be inserted into the water outflow pipeline connected to the boiler 2. Specifically, as shown in FIG. 7, the main cup body has an bulged part on the top at the side of the liquid chamber, and the bulged part form a downwardly directed plateau; the third pipe connector 16 is formed in a way that it bulges downward from the plateau, and the second pipe connector 15 is arranged in the space inside the bulged part.

It should be understood that the first pipe connector 111, the second pipe connector 15, and the third pipe connector 16 are not limited to the arrangement in this embodiment. Any other arrangement that can be used to connect the pipelines may be used.

Figure 4:
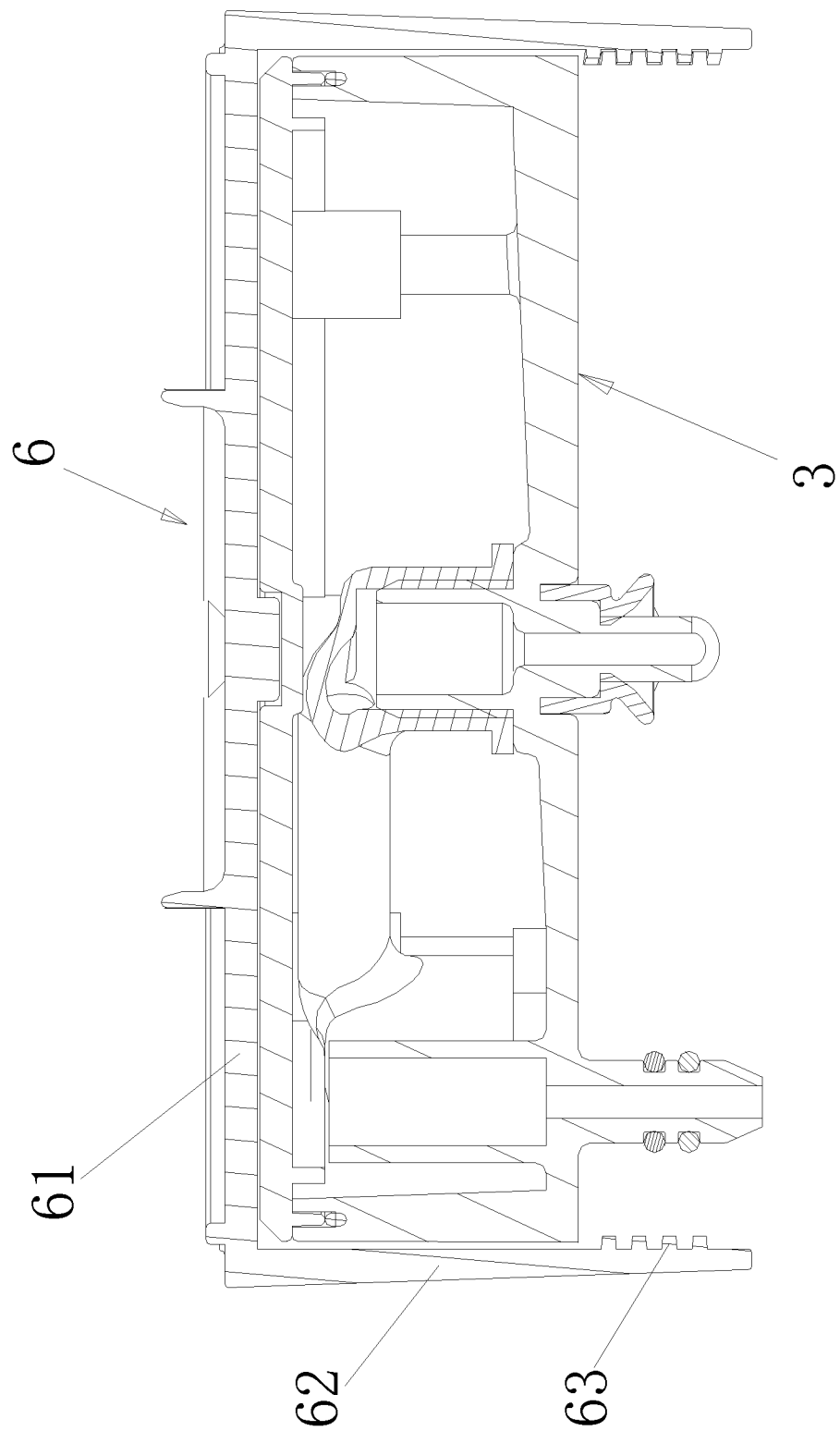
FIG. 4 is a sectional view of the structure of the cup cover that has a pressurizing device.

In addition, in this embodiment, male threads 17 extending in the circumferential direction are provided on the outer side of the top part of the main cup body, and the male threads 17 are used to connect the cup cover 6 by engaging with female threads 63 in the cup cover 6 (as shown in FIG. 4). Specifically, the cup cover 6 has a top wall 61 and a side wall 62 that has female threads 63 to be screwed to the cup body 1 by rotation, and the pressurizing device 3 is arranged in a way that it can rotate around an axis of rotation of the cup cover 6 with respect to the cup cover 6. In that way, when the cup cover 6 is rotated with respect to the cup body 1, the pressurizing device 3 can be stationary with respect to the cup body 1 (the pressurizing device 3 can't be rotated with respect to the cup body 1 since the water feed connector 33 of the pressurizing device 3 is connected to the second pipe connector 15 on the cup body 1). Thus, the pressurizing device 3 of the pressure chamber 30 is rotary with respect to the cup cover 6 but is not rotated.

In this embodiment, as shown in FIG. 4, the pressurizing device 3 can rotate freely in the internal space formed by the top wall 61 and side wall 62 of the cup cover 6 with respect to the cup cover 6, and a stop structure for preventing the pressurizing device 3 from moving out of the cup cover 6 is provided between the side wall 62 of the cup cover 6 and the pressurizing device 3.

In this embodiment, the stop structure is the female threads 63 arranged on the side wall 62 of the cup cover 6. The pressurizing device 3 is positioned at the side of the female threads 63 near the top wall 61, so that the female threads 63 can prevent the pressurizing device 3 from moving out of the cup cover 6.

Of course, the stop structure is not limited to the structural form in this embodiment. For example, the stop structure may be a protrusion arranged on the side wall 62 of the cup cover 6, which can prevent the pressurizing device 3 from moving out of the cup cover 6; alternatively, the stop structure may comprise a groove extending in the circumferential direction on the side wall 62 of the cup cover 6, and a protrusion arranged on the pressurizing device 3, which can slide in the groove; alternatively, the stop structure may comprise a groove extending in the circumferential direction on the pressurizing device 3, and a protrusion arranged on the side wall 62 of the cup cover 6, which can slide in the groove.

To make the cup cover 6 connected to the cup body in a sealed manner, as shown in FIG. 7, a seal groove 18 extending in the circumferential direction is provided on the outer side of the top part of the main cup body of the cup body 1 to accommodate a seal ring 181. When the cup cover 6 covers the top opening of the cup body 1, the cup cover 6 presses the seal ring 181, and thereby the cup cover 6 and the cup body 1 are sealed by means of the seal ring 181.

In addition, a beverage outlet that communicates with the liquid chamber 10 may be provided on the cup cover 6, and beverage can be poured out from the beverage outlet on the cup cover 6. Of course, the technical scheme provided in the present disclosure doesn't exclude an approach of separating the cup cover 6 from the cup body 1 to pour the beverage or an approach of fixing the cup cover 6 to the cup body 1 by snap-fitting so that the pressurizing device 3 doesn't have to be rotary with respect to the cup cover 6 but is directly fixed to the cup cover 6.

In this embodiment, the pressurizing device 3 comprises a shell in which the pressure chamber 30 is formed, and an inflow channel through which fluid can flow to the pressure chamber 30 and an outflow channel through which the fluid in the pressure chamber 30 can flow out (i.e., a third path for the fluid in the pressure chamber 30 to flow to the brewing chamber 40) are provided on the shell, wherein, the outflow channel is provided with the second check valve 36 that can be opened when the pressure in the pressure chamber 30 reaches a preset value.

That type of pressurizing device is simple in structure. As the fluid flows into the pressure chamber 30 through the inflow channel continuously, the pressure in the pressure chamber 30 is increased continuously. The second check valve 36 can be opened when the pressure reaches to a preset value, and thereby pressurized fluid can flow out of the pressure chamber 30.

In the beverage dispenser, the inflow channel of the pressurizing device 3 communicates with the outlet 22 of the boiler 2, and the outflow channel communicates with the brewing chamber 40 in which the beverage is brewed. Thus, the water vapor heated in the boiler 2 can flow through the inflow channel into the pressure chamber 30 of the pressurizing device 3 to pressurize the pressure chamber 30; then the pressurized liquid opens the second check valve 36 and enters into the brewing chamber 40 to brew the beverage. The pressurizing device 3 doesn't require a pressure pump or manual pressurization, and can realize fully automatic pressurization for brewing the beverage.

Figure 6A:
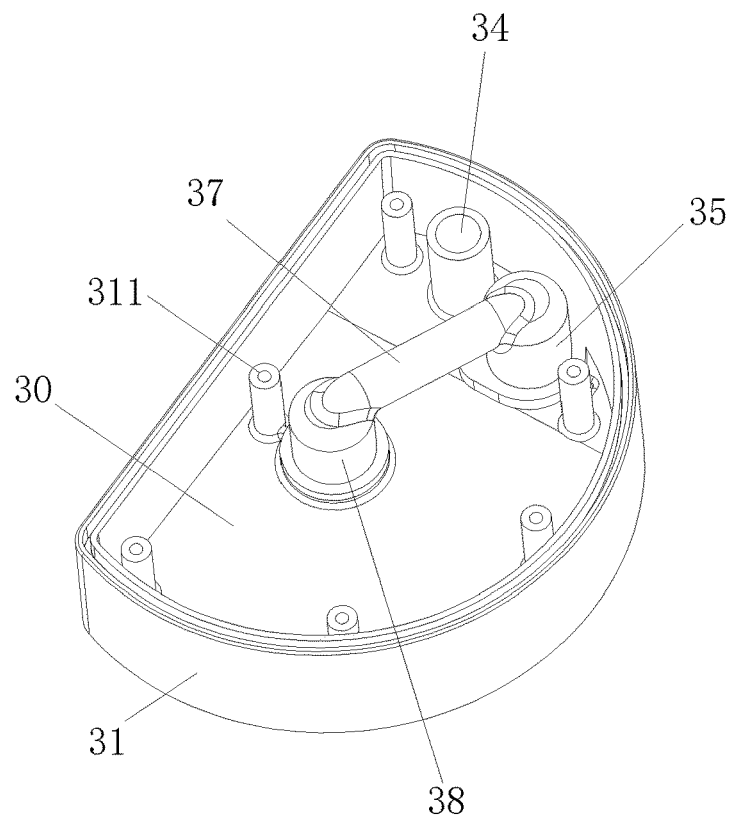
FIG. 6A is a schematic perspective view of the pressurizing device (the top cover is removed)
Figure 6B:
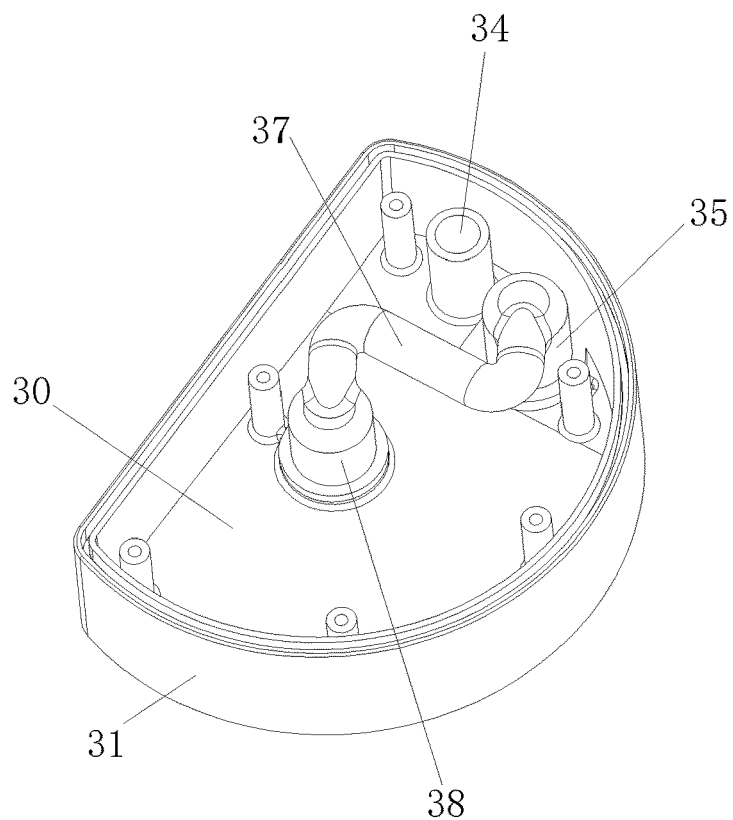
FIG. 6B is a schematic perspective view of the pressurizing device in another embodiment (the top cover is removed)

As shown in FIGS. 5-6B, the inflow channel of the pressurizing device 3 comprises a water feed connector 33 that protrudes outward from the shell and a water outflow pipeline section 34 that communicates with the water feed connector 33 and extends into the pressure chamber 30. Wherein, the water feed connector 33 is connected to the second pipe connector 15 of the cup body 1 so that the fluid in the boiler 2 can flows through the water feed connector 33 and the water outflow pipeline section 34 into the pressure chamber 30 to pressurize the pressure chamber 30. Wherein, the water feed connector 33 may be detached from the second pipe connector 15, the cup cover 6 with the pressurizing device 3 can be separated from the cup body 1 when the water feed connector 33 is detached from the second pipe connector 15, so that the cup body 1 can be cleaned easily.

The outflow channel of the pressurizing device 3 comprises a first pipeline section 35 that is provided on the shell and has an inlet of the outflow channel, a second pipeline section 38 that is provided on the shell and has an outlet of the outflow channel, and a communicating pipeline section 37 that communicates with the first pipeline section 35 and the second pipeline section 38.

More specifically, the inlet of the first pipeline section 35 is arranged at the bottom end, and the top end of the first pipeline section 35 is connected to the communicating pipeline section 37; the second check valve 36 is arranged in the first pipeline section 35, the valve spool of the second check valve 36 is kept in a closed state by its gravity and the downward pressure of the liquid, the liquid in the pressure chamber 30 can flow downward into the inlet of the first pipeline section 35 and push the valve spool upward to open the second check valve 36.

As indicated by the fluid flow direction in the first pipeline section 35 in FIG. 5, the fluid in the pressure chamber 30 flows downward and enters into the inlet of the first pipeline section 35, the fluid inside the first pipeline section 35 and below the second check valve 36 applies upward pushing force to the valve spool of the second check valve 36; when the pushing force of the fluid overcomes the weight of the valve spool and the downward pressure of the fluid, the valve spool will move up and open the second check valve 36, so that the fluid can further flow from the communicating pipeline section 37 to the second pipeline section 38, and then flow out through the outlet of the second pipeline section 38.

In this embodiment, the first pipeline section 35, the communicating pipeline section 37, and the second pipeline section 38 are connected to form a curved pipeline. In this technical scheme, by configuring the outflow channel as a curved pipeline, the raw beverage material or residues or the like in the brewing chamber of the beverage dispenser can be prevented from entering into the second check valve 36 inside the outflow channel, and thereby the residues or the like can be prevented from sucked back into the pressurizing device when the second check valve 36 is opened.

In some embodiments, the communicating pipeline section 37 forms a Z-shaped pipeline section, as shown in FIG. 6B. The Z-shaped pipeline section can effectively prevent residues or the like from sucked back into the pressurizing device 3 from the outflow channel. Of course, in other embodiments, the communicating pipeline section 37 may be configured into a different curved structure, or may be configured into a straight structure (as shown in FIG. 6A).

More preferably, the communicating pipeline section 37 may be a flexible pipeline section, which can be connected to the first pipeline section 35 and the second pipeline section 38 more conveniently.

Moreover, to further prevent the residues or the like in the brewing chamber of the beverage dispenser from entering into the pressurizing device, a filter screen 382 may be provided in the outflow channel; preferably, the filter screen 382 is provided in the second pipeline section 38.

As shown in FIG. 5, to mount the filter screen 382 conveniently, the second pipeline section 38 has a stepped hole formed in it, and the filter screen 382 is disposed on a stepped part 383 of the stepped hole. More specifically, the second pipeline section 38 includes a part that protrudes toward the interior of the pressure chamber 30 and configured to connect the communicating pipeline section 37 and a part that extends out of the pressure chamber 30, wherein, a hole that has a greater diameter in the part that protrudes toward the interior of the pressure chamber 30 and a hole that has a smaller diameter in the part that extends out of the pressure chamber 30 form the stepped hole.

In some embodiments, top puncturing pieces 381 are provided on the part of the second pipeline section 38 that extends out of the pressure chamber 30.

When the pressurizing device 3 is used in the beverage dispenser, the part of the second pipeline section 38 that extends out of the pressure chamber 30 can communicate with the brewing chamber 40 conveniently to inject liquid into the brewing chamber, and the top puncturing pieces 381 provided on that part can puncture beverage capsules placed in the brewing chamber 40, so that the liquid can be directly injected from the second pipeline section 38 into the beverage capsules to brew beverage.

Furthermore, in this embodiment, the shell of the pressurizing device 3 specifically comprises a main shell body 31 and a top cover 32 that covers the top part of the main shell body 31, the main shell body 31 and the top cover 32 form the pressure chamber 30. More specifically, a plurality of fixing columns 311 are provided on the main shell body 31, and the top cover 32 is fixed to the fixing columns 311 by bolts; moreover, to seal the pressure chamber 30, a sealing element may be provided between the top cover 32 and the main shell body 31; specifically, a seal groove extending in the circumferential direction may be arranged on the top surface of the side wall of the main shell body 31, a protrusion that protrudes downward may be arranged on the top cover 32, and the protrusion presses a sealing element in the seal groove so as to realize sealing between the top cover 32 and the main shell body 31.

Figure 10:
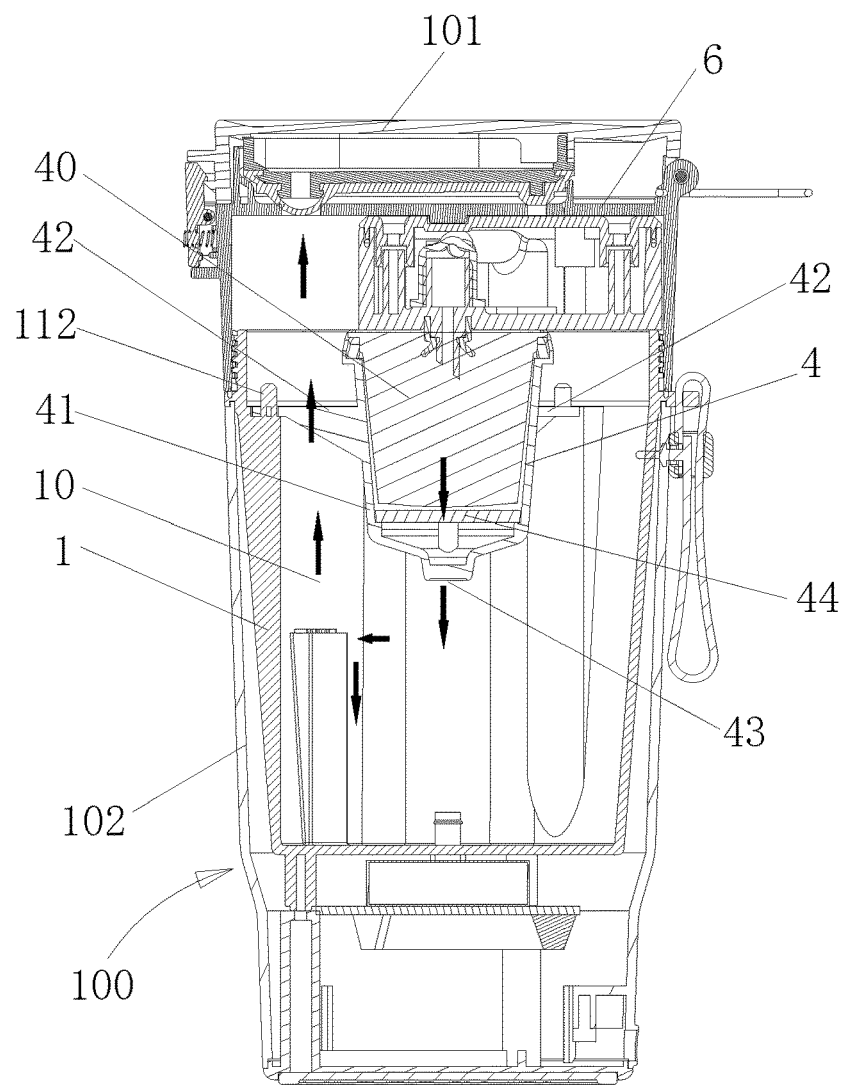
FIG. 10 is sectional view of the structure of the beverage dispenser.
Figure 11:
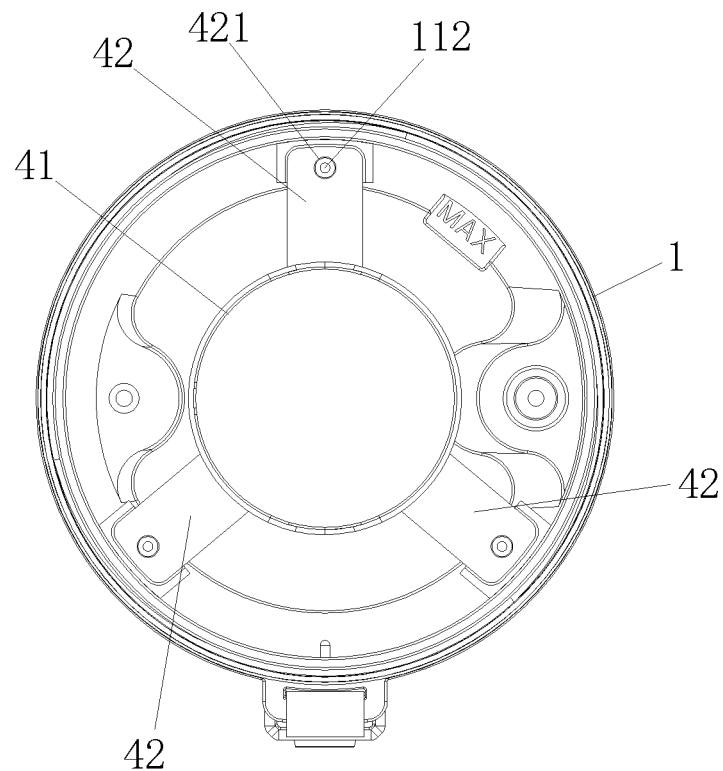
FIG. 11 is a schematic structural diagram illustrating the mounting of the brewing cup to the cup body.

In a embodiment, as shown in FIGS. 10 and 11, the brewing cup 4 is mounted on the top opening of the cup body 1; wherein, the brewing cup 4 comprises a main body part 41 that has the brewing chamber 40, and a plurality of legs 42 provided in a spaced manner in the circumferential direction on the main body part 41; a plurality of mounting parts corresponding to the legs 42 respectively are provided in a spaced manner in the circumferential direction of the top opening on the cup body 1, and the plurality of legs 42 are mounted removably to the mounting parts respectively.

Specifically, each leg 42 has a positioning hole 421, and positioning columns 112 are provided on the mounting part of the cup body 1 to fit with the positioning holes 421. Of course, downward positioning columns 112 may be arranged on the legs 42, and positioning holes may be arranged in the mounting part, and the positioning columns 112 are inserted into the positioning holes 421 when the brewing cup 4 is placed on the top opening of the cup body 1.

In some embodiments, three legs 42 are provided on the brewing cup 4 at even spacing, i.e., the legs are spaced by 120° from each other. Of course, more legs 42 may be provided. The arrangement of three legs 42 here is a preferred arrangement that ensures the brewing cup 4 is stably supported on the cup body 1.

In this embodiment, by arranging the brewing cup 4 on the cup body 1, the brewing cup 4 can be removed from the cup body 1 and then the cup body 1 can be cleaned conveniently; more importantly, after beverage is brewed, the space among the legs 42 of the brewing cup 4 form a channel through which the beverage in the cup body 1 can be poured out. As shown in FIG. 10, the liquid in the liquid chamber 10 can flow through the space among the legs 42 and then can be poured out from the opening of the cup cover 6 very conveniently.

Bottom puncturing pieces 47 are provided at the bottom part inside the brewing cup 4. To brew beverage, beverage capsules are placed in the brewing chamber 40 of the brewing cup 4, the top part of the beverage capsules is punctured by the top puncturing pieces 381 at the top part, while the bottom part of the beverage capsules is punctured by the bottom puncturing pieces 47 at the bottom part, so that the beverage brewed in the beverage capsules can flow through the bottom part into the cup body 1.

Figure 12:
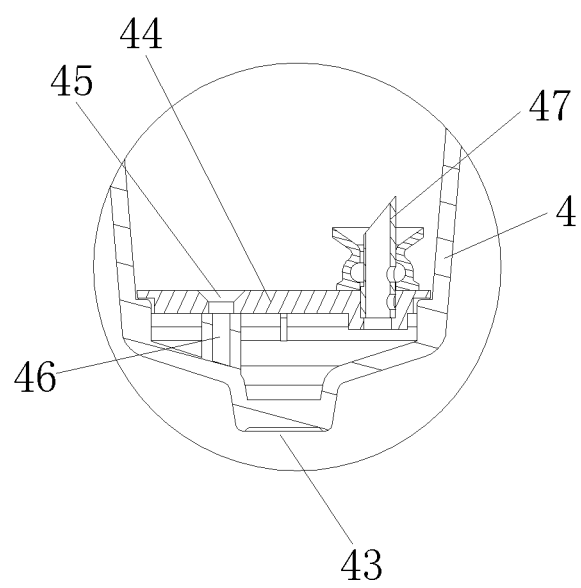
FIG. 12 is a partially enlarged view of the structure shown in FIG. 1.

In some embodiments, as shown in FIG. 12, a fixing plate 44 is provided at the bottom part inside the brewing cup 4, and the bottom puncturing pieces 47 are arranged on the fixing plate 44.

Specifically, the fixing plate 44 may be fixed by bolts to the main body part 41 of the brewing cup 4. Bolt holes 45 are arranged in the fixing plate 44, bolt mounting parts 46 extending upward are provided on the bottom of the main body part 41 of the brewing cup 4, and the bolts pass through the bolt holes 45 in the fixing plate 44 and are fixed to the bolt mounting parts 46, so that the fixing plate 44 is fixed.

To enable the beverage in the beverage capsule to flow out of the brewing chamber 40 into the cup body 1 more smoothly, preferably the bottom puncturing pieces 47 are formed by tubes which has a flow channel; a through-hole 43 communicating with the interior of the cup body 1 is arranged in the bottom of the brewing cup 4, and the flow channels of the tubes communicate with the through-hole 43. Thus, the beverage in the beverage capsule can flow into the through-hole 43 along the bottom puncturing pieces 47 and then flow into the cup body 1.

In the present disclosure, to enable the liquid to circulate through each of the chambers of the beverage dispenser, pipeline connections are provided among the chambers. Specifically, the inlet 21 of the boiler 2 is connected with the first pipeline 13, which is configured to communicate with the water outlet 11 of the cup body 1, and thereby the first path is formed between the liquid chamber 10 and the heating chamber 20. The outlet 22 of the boiler 2 is connected with the second pipeline 14, which is configured to communicate with the pressure chamber 30, and thereby the second path is formed between the heating chamber 20 and the pressure chamber 30. Furthermore, the second pipe connector 15 arranged on the cup body 1 is connected to the water feed connector 33 on the pressure chamber 30, and the third pipe connector 16 is connected to the second pipeline 14 of the boiler 2. The water vapor heated in the boiler 2 flows through the second pipeline 14 and the water feed connector 33 of the pressure chamber 30 into the pressure chamber 30. Wherein, the water feed connector 33 of the pressure chamber 30 is inserted into the second pipe connector 15, a seal ring 331 is provided between the water feed connector 33 and the second pipe connector 15, and the water feed connector 33 can be detached from the second pipe connector 15. When the water feed connector 33 is detached from the second pipe connector 15, the cup cover 6 with the pressurizing device 3 can be separated from the cup body 1, so that the cup body 1 can be cleaned easily.

When the internal pressure in the pressure chamber 30 is low, the valve spool of the second check valve 36 arranged in the third path between the pressure chamber 30 and the brewing chamber 40 (i.e., the outflow channel of the pressure chamber 30) seals the channel in the valve seat under gravity and the action of the liquid, and thereby the third channel is in a closed state, and the liquid in the pressure chamber 30 can't enter into the brewing chamber 40.

As the water vapor in the heating chamber 20 enters into the pressure chamber 30 continuously, the pressure in the pressure chamber 30 is increased gradually, and the mixture of water and vapor is forced to push the valve spool of the second check valve 36 upward, so that the valve spool opens the third path and thereby the liquid in the pressure chamber 30 can enter into the brewing chamber 40.

In the brewing chamber 40, puncturing pieces for puncturing beverage capsules placed in the brewing chamber 40 are provided at the top part and bottom part respectively. Wherein, the top puncturing pieces 381 are arranged on the second pipeline section 38 of the pressurizing device 3, and the brewing cup 4 is arranged on the cup body 1. When the cup cover 6 covers the top opening of the cup body 1, the top puncturing pieces 381 on the cup cover 6 can puncture the beverage capsules in the brewing cup 4. Thus, the liquid in the pressurizing device 3 can be directly injected through the second pipeline section 38 into the beverage capsules; then the bottom part of the beverage capsules are punctured by the bottom puncturing pieces 47, and the liquid beverage in the beverage capsule can flow into the brewing chamber 40 and then flow through the outlet of the brewing chamber 40 into the liquid chamber 10.

Furthermore, to prevent burst of the pressure chamber 30 resulted from excessively high pressure build-up in the pressure chamber 30 in the beverage dispenser, a pressure relief valve 39 may be added to the shell of the pressurizing device 3. The pressure relief valve 39 will relieve the pressure when the pressure in the pressure chamber 30 is increased to a certain value to avoid explosion of the pressure chamber 30 and possible injury to the user; wherein, the water vapor relieved via the pressure relief valve 39 flows through the clearance between the top cover 32 of the pressure chamber 30 and the cup cover 6 and then back to the cup body 1. To prevent excessively high pressure in the cup body 1, another pressure relief valve may be provided on the cup cover 6 to relieve the pressure in the cup body 1.

Furthermore, the beverage dispenser may comprise a housing 100 arranged outside. As shown in FIG. 1, the housing 100 comprises an outer cover 101 and a main housing body 102 that has a top opening. The outer cover 101 covers the cup cover 6, and the main housing body 102 accommodates the cup body 1, the boiler 2, and the heating component. Wherein, a battery or power supply interface may be arranged at the bottom of the main housing body 102 to supply current for heating in the boiler 2.

In some embodiments, the outer cover 101 is configured in a way that it can be turned over and then cover the cup cover 6. When the outer cover 101 is turned over and covers the cup cover 6, a sealing part arranged on the outer cover 101 can block off the beverage outlet on the cup cover 6 to prevent leakage of the beverage; when the outer cover 101 is turned over to an open state, the opening of the cup cover 6 can be opened and the beverage can be poured out.

Figure 8:
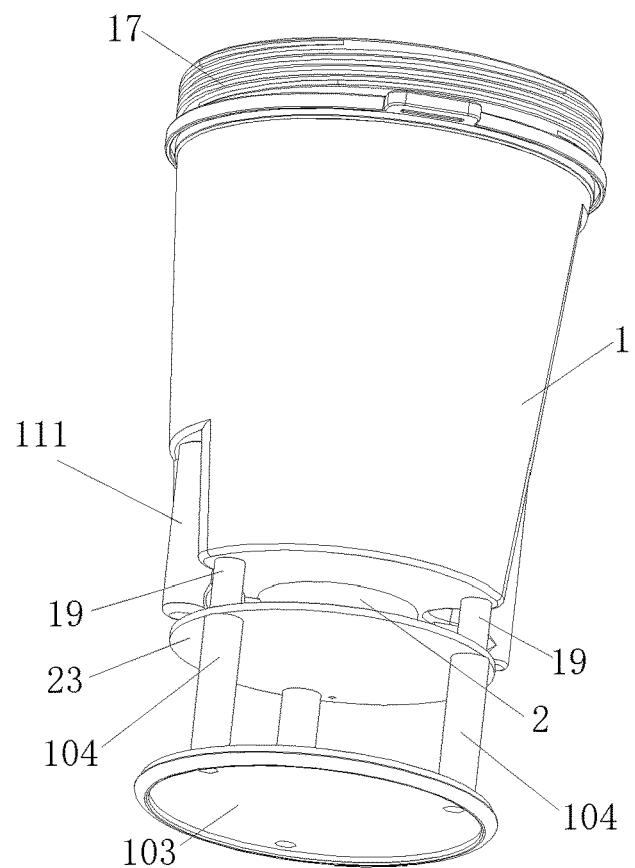
FIG. 8 is a schematic perspective view illustrating the mounting of the boiler on the bottom of the cup body.
Figure 9:
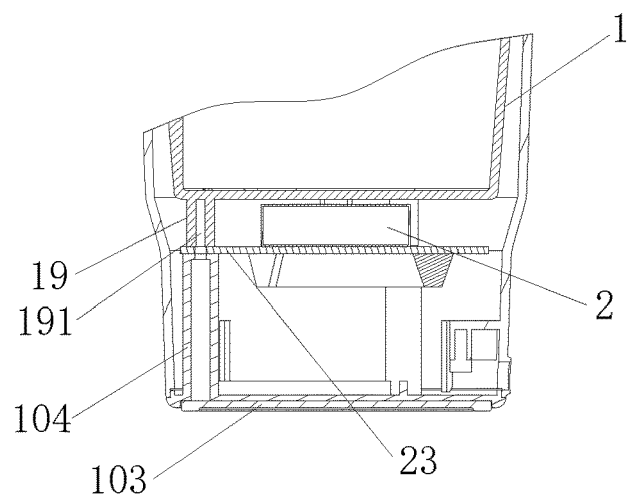
FIG. 9 is a sectional view of a part of the structure shown in FIG. 8.

In addition, in this embodiment, the boiler 2 is disposed below the cup body 1. To mount and fix the boiler 2, as shown in FIGS. 8 and 9, a supporting plate 23 that is fixed to the cup body 1 and configured to support the boiler 2 is provided below the cup body 1. Specifically, a plurality of columns 19 for mounting bolts are provided at the bottom of the cup body 1, a plurality of bolt mounting parts 104 that correspond to the columns 19 respectively and thereby are fixed to the columns 19 by bolts are provided on a bottom enclosure 103 of the main housing body 100, and the supporting plate 23 configured to support the boiler 2 is fixed between the bolt mounting parts 104 and the columns 19. In some embodiments, three columns 19 are arranged in the circumferential direction of the cup body 1 in a spaced manner. It is a preferred arrangement to arrange three columns 19 to fix the supporting plate 23 firmly.

Specifically, the columns 19 on the bottom of the cup body 1 have bolt mounting holes 191. In the mounting process, bolts are inserted from the outer side of the bottom enclosure 103 and pass through the holes in the bolt mounting parts 104 (a stop structure configured to stop the bolt head is arranged at the end of each hole near the column 19); then the bolts are screwed into the bolt mounting holes 191 in the columns 19. In that way, the supporting plate 23 is fixed between the columns 19 and the bolt mounting parts 104, and the boiler 2 is firmly fixed to the bottom of the cup body 1. Wherein, the space above the bottom enclosure 103 can be utilize to mount a battery or other parts and components of the beverage dispenser. In this embodiment, the mounting structure of the boiler 2 and the cup body 1 is simple and compact. Utilizing the mounting assembly in the beverage dispenser, the structure of the beverage dispenser can be reduced in size, and the beverage dispenser is convenient to carry.

Hereunder the application process of the beverage dispenser provided in the present disclosure will be further detailed with reference to FIG. 1.

The water feed connector 33 of the pressure chamber 30 is detached from the second pipe connector 15 of the cup body 1, so that the cup cover 6 with the pressurizing device 3 is separated from the cup body 1. Thus, water can be injected into the cup body 1, and the water in the cup body 1 can enter into the heating chamber 20 via the open first check valve 5.

When electric power is supplied to the heating component of the boiler 2, the heating component will heat up the water in the heating chamber 20. The water vapor produced through the heating flows via the left inlet 21 into the first path and flow via the right outlet 22 into the second path; the water vapor in the first path pushes the valve spool of the first check valve 5 to close the first path; the water vapor in the heating chamber 20 flows through the second path into the pressure chamber 30 continuously. When the pressure in the pressure chamber 30 reaches a preset value, the second check valve 36 in the third path between the pressure chamber 30 and the brewing chamber 40 will be opened, and the liquid in the pressure chamber 30 will flow through the first pipeline section 35, the communicating pipeline section 37, and the second pipeline section 38 into the brewing chamber 40 of the brewing cup 4. Then, the beverage brewed in the brewing chamber enters into the liquid chamber 10 of the cup body 1. Thus, the liquid is circulated through the chambers continuously. The power supply time can be set to control the operation time of the beverage dispenser. The beverage dispenser operates automatically during the time the electric power is supplied. After the beverage dispenser operates for certain time, the beverage in the beverage dispenser is ready to serve.

The present disclosure further provides a beverage brewing method, which comprises:

Injecting liquid into a liquid chamber 10;

The liquid in the liquid chamber 10 enters into a heating chamber 20 for heating;

The liquid heated in the heating chamber 20 enters into a pressure chamber 30 for pressurization;

The liquid pressurized in the pressure chamber 30 enters into the brewing chamber 40 to brew a raw beverage material in the brewing chamber 40; and The beverage brewed in the brewing chamber 40 returns to the liquid chamber 10.

The beverage brewing method provided in the present disclosure can utilize the beverage dispenser described above. As shown in FIG. 1, the beverage dispenser is formed with a liquid chamber 10, a brewing chamber 40, a heating chamber 20 that can heat up liquid, and a pressure chamber 30 that can pressurize the liquid; wherein, the liquid chamber 10, the heating chamber 20, the pressure chamber 30, and the brewing chamber 40 form a circulating liquid circuit, in which the liquid formed in the liquid chamber 10 enters into the heating chamber 20, is heated in the heating chamber 20 and then enters into the pressure chamber 30, is pressurized in the pressure chamber 30 and then enters into the brewing chamber 40, and then flows out of the brewing chamber 40 and enters into the liquid chamber 10. The liquid is circulated through the chambers, and cold liquid, hot liquid, and beverage can coexist, and hot beverage can be produced under pressure.

The beverage brewing method described above can be executed with the beverage dispenser. With the beverage brewing method, the user doesn't have to add hot water manually; in addition, cold water may be used to produce hot beverage through heating. The method is especially applicable to portable beverage dispensers, and overcomes the drawback that hot water has to be added manually in portable beverage dispensers available in the market. Besides, the beverage brewing method can be used to produce beverage automatically without manual operation for pressurization.

Hereunder the beverage brewing method provided in the present disclosure will be described in an embodiment with reference to the beverage dispenser shown in FIG. 1. The beverage dispenser shown in FIG. 1 is a portable beverage dispenser. Of course, it should be understood that the beverage brewing method provided in the present disclosure is not limited to the portable beverage dispenser shown in FIG. 1. Other beverage dispensers in different structural forms, such as beverage dispensers used at home or in other scenarios, may also utilize the beverage brewing method.

As shown in FIGS. 1-3, a first check valve 5 is provided in a first path between the liquid chamber 10 and the heating chamber 20, a valve spool of the first check valve 5 can move by its gravity and the action of the liquid pressure in the liquid chamber 10 and thereby keeps the first check valve 5 in an open state, so that the liquid in the liquid chamber 10 enters into the heating chamber 20 via the first check valve 5. Further specifically, the first path between the liquid chamber 10 and the heating chamber 20 comprises a first pipeline 13 between a water outlet 11 of the liquid chamber 10 near the bottom of the liquid chamber 10 and an inlet 21 on the right side of the heating chamber 20; the first check valve 5 is provided in the first pipeline 13.

Water vapor produced from the liquid in the heating chamber 20 in the heating process enters into the first path and drives the valve spool of the first check valve 5 to move, and thereby closes the first check valve 5.

A second path is provided between the heating chamber 20 and the pressure chamber 30, and the liquid heated in the heating chamber 20 enters into the pressure chamber 30 along the second path under the action of the pressure of the water vapor produced in the heating process. The second path comprises a second pipeline 14 connected to the outlet 22 on the left side of the heating chamber 20 and a water feed connector 33 that communicates with the second pipeline 14 and the pressure chamber 30, and the liquid flows via the water feed connector 33 into the pressure chamber 30. Of course, it should be noted that the beverage brewing method provided in the present disclosure doesn't exclude utilizing a water pump to pump the liquid in the heating chamber 20 to the pressure chamber 30 and thereby pressurize the pressure chamber 30.

A third path is provided between the pressure chamber 30 and the brewing chamber 40. As shown in FIG. 5, a second check valve 36 is provided in the third path. The liquid heated in the heating chamber 20 flows into the pressure chamber 30 under the action of the pressure of water vapor produced through the heating process, the water vapor in the pressure chamber 30 is increased continuously, and thereby the pressure in the pressure chamber 30 is increased continuously. When the pressure in the pressure chamber 30 reaches a preset value, the second check valve 36 will be opened, and thereby the liquid in the pressure chamber 30 can enter into the brewing chamber 40.

The brewing chamber 40 has an opening that communicates with the liquid chamber 10, and beverage capsules may be placed in the brewing chamber 40. Therefore, the brewing method further comprises placing beverage capsules that contain the raw beverage material in the brewing chamber 40 and puncturing the beverage capsules before heating is carried out in the heating chamber 20. The liquid flowing into the brewing chamber 40 brews the beverage capsules, and then the beverage produced in the brewing process flows back to the liquid chamber 10.

Usually, the liquid is circulated through the liquid chamber 10, the heating chamber 20, the pressure chamber 30, and the brewing chamber 40 over and again; the cycle time of the liquid is usually longer than 2 min.

In a circulation cycle, the liquid may be injected from the liquid chamber 10 into the heating chamber 20 for several time, the heating chamber 20 heats up the injected liquid for several times before the preset pressure in the pressure chamber 30 can be reached. After that, the liquid in the pressure chamber 30 can enter into the brewing chamber 40 under the action of the pressure.

In some embodiments, in a portable beverage dispenser, the volume V of water injected from the pressure chamber 30 into the brewing chamber 40 is 5 ml<V<30 ml in a circulation cycle of the liquid; the rate R of water injection from the pressure chamber 30 into the brewing chamber 40 is 1 ml/s<R<3 ml/s.

In should be understood: in other types of beverage dispensers, e.g., household beverage dispensers, the volume and rate of water injection from the pressure chamber 30 into the brewing chamber 40 may be set to higher values.

Hereunder the beverage brewing process of a beverage dispenser with the beverage brewing method provided in the present disclosure will be further detailed with reference to FIG. 1.

The water feed connector 33 of the pressure chamber 30 is detached from the second pipe connector 15 of the cup body 1, so that the cup cover 6 is separated from the cup body 1. Thus, water can be injected into the cup body 1, and the water in the cup body 1 can enter into the heating chamber 20 by opening the first check valve 5;

When electric power is supplied to the heating component of the boiler 2, the heating component will heat up the water in the heating chamber 20. The water vapor produced through the heating flows via the left inlet 21 into the first path and flow via the right outlet 22 into the second path; the water vapor in the first path pushes the valve spool of the first check valve 5 to close the first path; the water vapor in the heating chamber 20 flows through the second path into the pressure chamber 30 continuously. When the pressure in the pressure chamber 30 reaches a preset value, the second check valve 36 in the third path between the pressure chamber 30 and the brewing chamber 40 will be opened, and the liquid in the pressure chamber 30 will flow through the first pipeline section 35, the communicating pipeline section 37, and the second pipeline section 38 into the brewing chamber 40 of the brewing cup 4. Then, the beverage brewed in the brewing chamber enters into the liquid chamber 10 of the cup body 1. Thus, the liquid is circulated through the chambers continuously. The power supply time can be set to control the operation time of the beverage dispenser. The beverage dispenser operates automatically during the time the electric power is supplied. After the beverage dispenser operates for certain time, the beverage in the beverage dispenser is ready to serve.

While the present disclosure is described above in detail in some preferred embodiments with reference to the accompanying drawings, the present disclosure is not limited to those embodiments. Various simple variations may be made to the technical scheme in the present disclosure, including combinations of the specific technical features in any appropriate form, within the scope of the technical ideal of the present disclosure. To avoid unnecessary repetition, the possible combinations are not described specifically in the present disclosure. However, such simple variations and combinations shall also be deemed as having been disclosed and falling in the scope of protection of the present disclosure.

The invention claimed is:

1. A beverage dispenser comprising:
    a liquid chamber;
    a brewing chamber;
    a heating chamber that can heat up liquid; and
    a pressure chamber that can pressurize the liquid;
    wherein, the liquid chamber, the heating chamber, the pressure chamber, and the brewing chamber form a circulating liquid circuit, in which the liquid in the liquid chamber enters into the heating chamber, is heated in the heating chamber and then enters into the pressure chamber, and the liquid is pressurized in the pressure chamber and then enters into the brewing chamber, and then flows out of the brewing chamber and enters into the liquid chamber, wherein:
    a first path is provided between the liquid chamber and the heating chamber, a first check valve is provided in the first path, and the liquid in the liquid chamber can enter into the heating chamber by opening the first check valve;
    a third path is provided between the pressure chamber and the brewing chamber, a second check valve is provided in the third path and is configured to open the third path under pressure in the pressure chamber, wherein the first path is disposed vertically along a periphery of the liquid chamber.

2. The beverage dispenser according to claim 1, wherein volume V1 of the heating chamber is: 5 ml<V1<20 ml, and heating power P for heating in the heating chamber is: 50 W<P<300 W.

3. The beverage dispenser according to claim 1, wherein the first check valve is configured to cut off the first path under a driving power of water vapor formed from the liquid heated in the heating chamber.

4. The beverage dispenser according to claim 1, wherein a second path is provided between the pressure chamber and the heating chamber, and the liquid in the heating chamber enters into the pressure chamber along the second path under pressure of water vapor formed through the heating.

5. The beverage dispenser according to claim 1, comprising:
    a cup body, which forms the liquid chamber and has a water outlet for communicating with the heating chamber;
    a cup cover that covers a top opening of the cup body, wherein, a pressurizing device that has the pressure chamber is provided at an inner side of the cup cover that faces the cup body;
    a brewing cup, which forms the brewing chamber and is disposed between the pressure chamber and the cup body, and has a water inlet that can communicate with the pressure chamber and a water outlet that communicates with the liquid chamber; and a boiler and a heating component for heating the boiler, wherein, the boiler forms the heating chamber, is disposed below the cup body, and has an inlet that communicates with the liquid chamber and an outlet that communicates with the pressure chamber.

6. The beverage dispenser according to claim 5, wherein a supporting plate fixed to the cup body is provided below the cup body and configured to support the boiler.

7. The beverage dispenser according to claim 6, further comprising:
a housing, which comprises an outer cover and a main housing body that has a top opening, wherein, the outer cover covers the cup cover, and the main housing body accommodates the cup body, the boiler, and the heating component;
wherein a plurality of columns for mounting bolts are provided at the bottom of the cup body, a plurality of bolt mounting parts that correspond to the columns respectively and thereby are fixed to the columns by bolts are provided on a bottom enclosure of the main housing body, and the supporting plate configured to support the boiler is fixed between the bolt mounting parts and the columns.

8. The beverage dispenser according to claim 5, wherein puncturing pieces are provided on the top part and bottom part of the brewing chamber inside the brewing chamber for puncturing beverage capsules placed in the brewing chamber.

9. The beverage dispenser according to claim 5, wherein the cup body comprises a main cup body in which the liquid chamber is formed, a boss is formed on the bottom of the main cup body, and the water outlet is provided on the boss.

10. The beverage dispenser according to claim 5, wherein the cup body comprises a main cup body in which the liquid chamber is formed, a second pipe connector configured to connect a pipeline and a third pipe connector that communicates with the second pipe connector and is configured to connect another pipeline are provided on the top part of the main cup body, the second pipe connector communicates with the pressure chamber through a pipeline, and the third pipe connector communicates with the heating chamber through a pipeline.

11. The beverage dispenser according to claim 5, wherein the cup cover has a top wall and a side wall that has female threads to be screwed to the cup body by rotation, and the pressurizing device is arranged in a way that it can rotate around an axis of rotation of the cup cover with respect to the cup cover.

12. The beverage dispenser according to claim 5, wherein the pressurizing device comprises a shell in which the pressure chamber is formed, and an inflow channel through which fluid can flow to the pressure chamber and an outflow channel through which the fluid in the pressure chamber can flow out are provided on the shell, wherein, the outflow channel is provided with the second check valve that can be opened when the pressure in the pressure chamber reaches a preset value.

13. The beverage dispenser according to claim 5, wherein the brewing cup is mounted on the top opening of the cup body; wherein, the brewing cup comprises a main body part that has the brewing chamber, and a plurality of legs provided in a spaced manner in the circumferential direction on the main body part; a plurality of mounting parts corresponding to the legs respectively are provided in a spaced manner in the circumferential direction of the top opening on the cup body, and the plurality of legs are mounted removably to the mounting parts respectively.

14. A beverage dispenser comprising, comprising:
a liquid chamber;
a brewing chamber;
a heating chamber that can heat up liquid; and
a pressure chamber that can pressurize the liquid;
wherein, the liquid chamber, the heating chamber, the pressure chamber, and the brewing chamber form a circulating liquid circuit, in which the liquid in the liquid chamber enters into the heating chamber, is heated in the heating chamber and then enters into the pressure chamber, and the liquid is pressurized in the pressure chamber and then enters into the brewing chamber, and then flows out of the brewing chamber and enters into the liquid chamber, a cup body, which forms the liquid chamber and has a water outlet for communicating with the heating chamber;
a cup cover that covers a top opening of the cup body, wherein, a pressurizing device that has the pressure chamber is provided at an inner side of the cup cover that faces the cup body;
a brewing cup, which forms the brewing chamber and is disposed between the pressure chamber and the cup body, and has a water inlet that can communicate with the pressure chamber and a water outlet that communicates with the liquid chamber; and
a boiler and a heating component for heating the boiler, wherein, the boiler forms the heating chamber, is disposed below the cup body, and has an inlet that communicates with the liquid chamber and an outlet that communicates with the pressure chamber,
wherein the pressurizing device comprises a shell in which the pressure chamber is formed, and an inflow channel through which fluid can flow to the pressure chamber and an outflow channel through which the fluid in the pressure chamber can flow out are provided on the shell, wherein, the outflow channel is provided with a second check valve that can be opened when the pressure in the pressure chamber reaches a preset value.

15. The beverage dispenser according to claim 14, wherein the outflow channel comprises a first pipeline section that is provided on the shell and has an inlet of the outflow channel, a second pipeline section that is provided on the shell and has an outlet of the outflow channel, and a communicating pipeline section that is provided between the first pipeline section and the second pipeline section and communicate with the first pipeline section and the second pipeline section, the first pipeline section, the communicating pipeline section, and the second pipeline section are connected to form a curved pipeline, wherein, the second check valve is arranged in the first pipeline section.

16. The beverage dispenser according to claim 14, wherein the inflow channel comprises a water feed connector that protrudes from the shell and a water outflow pipeline section that communicates with the water feed connector and extends into the pressure chamber.

17. The beverage dispenser according to claim 14, wherein a pressure relief valve is provided on the shell.

18. A beverage dispenser comprising, comprising:
a liquid chamber;
a brewing chamber;
a heating chamber that can heat up liquid; and
a pressure chamber that can pressurize the liquid;
wherein, the liquid chamber, the heating chamber, the pressure chamber, and the brewing chamber form a circulating liquid circuit, in which the liquid in the liquid chamber enters into the heating chamber, is heated in the heating chamber and then enters into the pressure chamber, and the liquid is pressurized in the pressure chamber and then enters into the brewing chamber, and then flows out of the brewing chamber and enters into the liquid chamber, a cup body, which forms the liquid chamber and has a water outlet for communicating with the heating chamber;

a cup cover that covers a top opening of the cup body, wherein, a pressurizing device that has the pressure chamber is provided at an inner side of the cup cover that faces the cup body;

a brewing cup, which forms the brewing chamber and is disposed between the pressure chamber and the cup body, and has a water inlet that can communicate with the pressure chamber and a water outlet that communicates with the liquid chamber; and a boiler and a heating component for heating the boiler, wherein, the boiler forms the heating chamber, is disposed below the cup body, and has an inlet that communicates with the liquid chamber and an outlet that communicates with the pressure chamber, wherein the cup cover has a top wall and a side wall that has female threads to be screwed to the cup body by rotation, and the pressurizing device is arranged in a way that it can rotate around an axis of rotation of the cup cover with respect to the cup cover.

* * * * *